Dec. 22, 1942.    J. MERCIER    2,306,135
PROPELLER WITH VARIABLE PITCH
Filed May 27, 1939    2 Sheets-Sheet 1
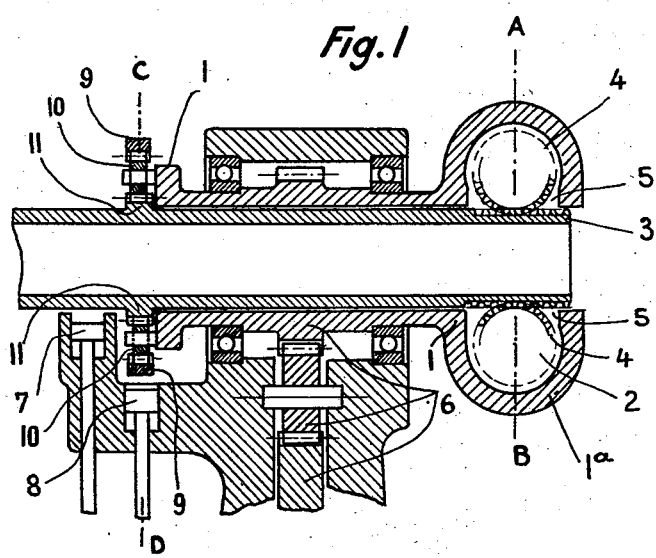
Fig. 1
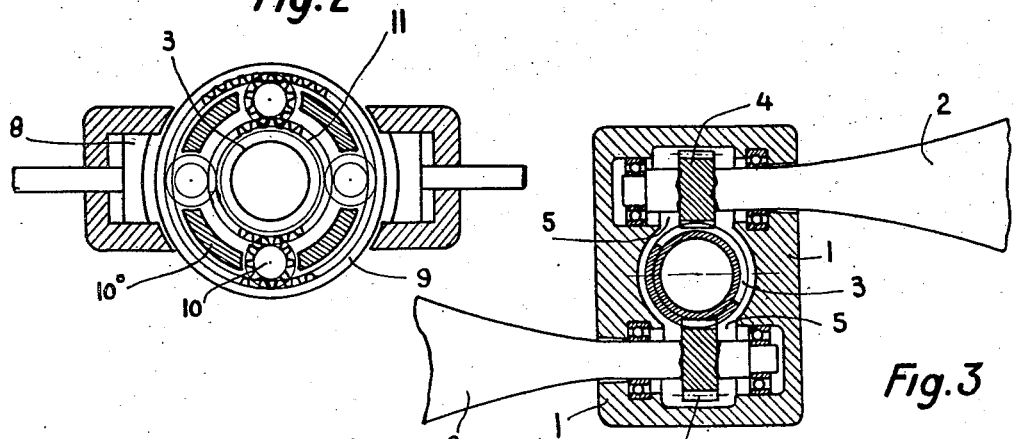
Fig. 2
Fig. 3
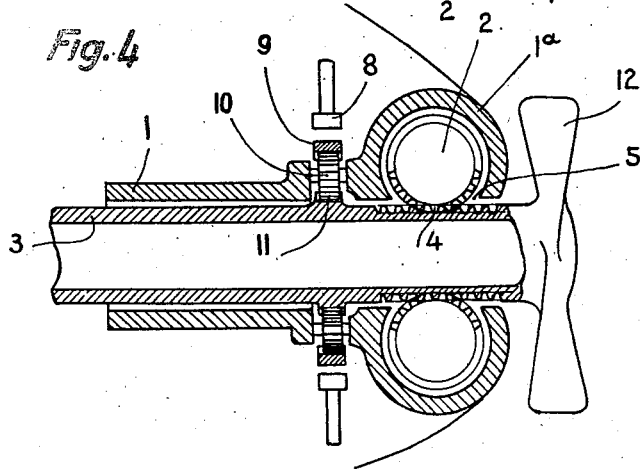
Fig. 4
Jean Mercier
INVENTOR
By Otto Munk
his ATT'Y.

Patented Dec. 22, 1942

2,306,135

UNITED STATES PATENT OFFICE 2,306,135

PROPELLER WITH VARIABLE PITCH

Jean Mercier, Neuilly-sur-Seine, France; vested in the Alien Property Custodian

Application May 27, 1939, Serial No. 276,030
In France May 31, 1938

1 Claim. (Cl. 170—163)

The present invention has for its object a propeller with variable pitch, and chiefly a propeller in which the blades are tangent to a hub.

Propellers are already known in which the pitch of the propeller blades may be changed by means of an endless screw, a worm or the like mounted inside the hub and acting upon gear wheels, each of which is secured to one blade, the endless screw being preferably hollow and adapted for instance, for the insertion of a gun through the propeller shaft and also for the reduction of weight of the whole apparatus.

This arrangement permits of changing the pitch of the propeller blades by simply producing a delay or an advance of the endless screw with reference to the hub carrying the blades. It is to be observed that these delays or advances of the endless screw result in angular movements of this latter with reference to the hub. These movements when transmitted to the blades by means of the above mentioned gearing, control the variations of the pitch of these blades. The angular movements of the endless screw, and hence the variations of the propeller pitch, can be obtained either automatically according to the speed of the engine, to the speed of flight or to the aerodynamic resistances, or by the control of the pilot.

A considerable number of different means may be provided for the obtainment of these advances or delays in the rotation of the endless screw with reference to the hub.

It has also been proposed to use one of the following means:

An electric motor or the like, mounted on the hub and actuating the endless screw or worm;

A system of two brakes, one of which is a friction brake and adapted to reduce the speed of rotation of the said worm with reference to the speed of the hub, while the other acts upon a gearing, known per se, and consisting of a toothed ring which surrounds the said worm and meshes with a second toothed ring secured to this worm by means of a certain number of planetary pinions, the braking of the outer toothed ring causing a forward motion of the worm.

According to the invention, use is made in the case of propellers of this type of:

(a) An aerodynamic brake consisting of a wind-wheel or a like device secured to the front end of the endless screw the blades of this wheel being adapted to be always out of a casing and to have a fixed or variable inclination, or being able to be withdrawn when in the idle position and to be brought out when in their operative position either by a control or automatically according to the speed of flight, this aerodynamic brake being adapted to be combined with a brake provided with planetary pinions and planetary toothed rings;

(b) A single brake of the friction or the aerodynamic type, which brakes the endless screw and brings, for instance, the propeller blades to the large pitch, the return of these blades to the small pitch (advance of the endless screw) being effected automatically either by means of elastic reaction members such as a spiral torque spring which is suitably mounted on the worm or by choosing a reversible thread for this endless screw or worm. The screw is then actuated by the aerodynamic or centrifugal reaction acting upon the propeller blades.

In the accompanying drawings, given solely by way of example:

Figure 1 is an elevational view in longitudinal section of a known embodiment of a propeller with variable pitch, showing the front part of the driving shaft of the propeller;

Figure 2 is a section on the line C—D of Figure 1;

Figure 3 shows a section on the line A—B of Figure 1;

Figure 4 is a view similar to Figure 1, of an embodiment comprising an aerodynamic brake according to the invention;

Figure 5:
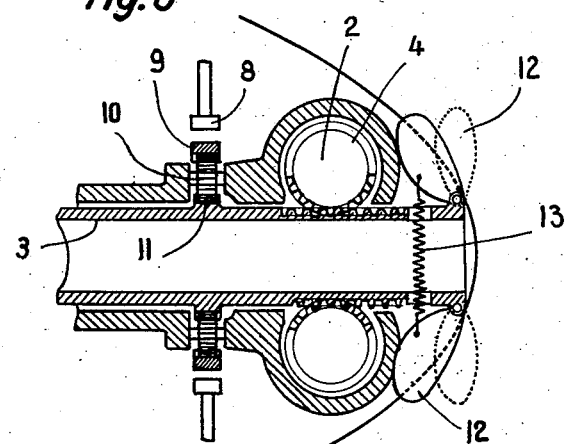
Figure 5 shows a modification of the example of Figure 4 in which the blades of the wind-wheel forming an aerodynamic brake can be automatically withdrawn.

In the embodiment shown in Figures 1 to 3, the propeller is eccentric with reference to the engine crankshaft, the driving shaft or the hub of the propeller being driven by this crankshaft through the insertion of a speed-increasing or a speed-reducing member. The device comprises a hub 1 forming a support 1ᵃ for the propeller blades 2 which are placed tangentially with reference to this hub. Hub 1 is hollow, and contains inside a sleeve 3 which is threaded on its outer surface so as to form an endless screw or a worm, meshing with a toothed part 4 formed on either propeller blade and passing through apertures 5 provided in the hub.

The hub 1 is rotated by means of a suitable gearing 6 actuated by an engine of any kind. The advance and the delay of the sleeve 3 with reference to the hub 1 are given respectively by the brakes 7 and 8. The brake 7, which acts directly upon the sleeve 3 forming an endless screw thus provides for the delay of this sleeve, whereas the brake 8 acts upon the sleeve 3 by means of a gearing, known per se, consisting of planetary discs and of planetary pinions, and controls the advance of the sleeve with reference to the hub. This gearing is shown diagrammatically and in greater detail in Figure 2.

It will be observed that the brake shoes 8 act upon the outside of a planetary toothed ring 9 which engages a certain number of planetary pinions 10 which are loosely mounted in a ring 10ª secured to the hub, and meshing on the other hand with a toothed ring 11 secured to the sleeve 3.

The two brakes 7 and 8 may be driven by any suitable control, of the electric, hydraulic, pneumatic, mechanical or other type, either by the pilot, or automatically according to the speed, to the inclination of the aeroplane, to the air pressure, etc. For instance, a speed governor may control an air distributor which in turn would operate the two brakes.

The operation of the arrangement described hereabove is as follows: In the normal position, i. e., when neither of the brakes is actuated, sleeve 3 forming an endless screw is rotated at the same speed as the hub 1, so that the pitch of the propeller blades 2 remains constant. A fastening or a locking of sleeve 3 and hub 1 can also be provided. When applying the brake 7, the endless screw 3 is slowed with reference to the hub 1, this having as effect to bring the blades of the propeller 2 first to the reduced pitch and then to the reversed pitch.

When applying brake 8, the rotation of the planetary ring 9 is braked, thus effecting the inverse rotation of the planetary pinions 10 and hence an advance of the sleeve 3 with reference to the hub 1. This advance produces the return of the propeller blades to the position corresponding to the large pitch.

This embodiment is known per se.

Figure 4 shows an embodiment according to the invention in which the brake 8 is retained, but the brake 7 is eliminated and replaced by a windwheel 12 mounted on the front end of the sleeve 3. It will be observed that this wind-wheel exerts a braking or retarding action upon the sleeve 3 during its rotation, this action of the windwheel blades varying with the density of the air. When the wind-wheel blades have the slightly helical shape shown in Fig. 4, the action of the wind-wheel will also be effected by the speed of the aeroplane as well as by the other aerodynamic reactions, and may even cause a reaction in the contrary direction, and hence an advance of the sleeve 3 with reference to the hub 1.

According to the modification shown in Figure 5, the blades 12 of the wind-wheel are pivoted on the sleeve 3 and are subjected to the action of a spring 13 or the like which is so disposed that the blades are hidden in the rear part near the axis of the sleeve 3 (in the position of rest shown in full lines). The force of the spring 13 is calculated so that the blades 12 will be brought into their raised position (shown by dotted lines) or operative position, only when the rate of rotation of the endless screw 3 and of the hub 1 has reached a determined value, i. e., from the moment when the centrifugal force permits of superseding the force of spring 13. It will be observed that in this case the passage to the large pitch is effected automatically.

On the contrary to what takes place in the known embodiment of Figures 1 to 3, the friction brake 8 (not shown in Figure 5) which determines the advance of the sleeve 3, will evidently produce in this case the return of the propeller blades to the small pitch, this being obtained by a simple reversal of the thread of the endless screw 3.

Figure 6:
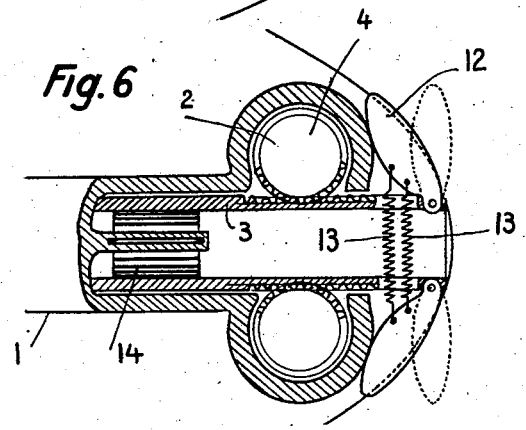
Figure 6 is a view partly in section showing an embodiment with a single brake in which the return of the propeller blades to the large pitch is obtained by means of a spring mounted on the endless screw or worm.

Figure 6 shows an embodiment in which a spiral torque spring 14 is disposed between the shaft 1 and the endless screw 3, which automatically brings this screw into a given position corresponding to the small pitch when the forces tending to displace the propeller blades from this position stop to act. In Figure 6, this spring 14 has been combined with a wind-wheel 12 having pivoted blades, but it is evident that the spring 14 might as well be combined with a friction brake such as the brake 8 shown in Figure 1. Obviously, the reaction spring 14 could be replaced by any other appropriate means.

The system above described and shown in Figure 5 is not only very simple in its construction and of a very reliable operation but permits also of executing extremely easily the most different operations. For instance, if in a touring flight, the operating pressure in the brake 8 is maintained at the zero point, i. e., as long as the brake is not used, the propeller blades remain at the reduced pitch, and the engine rotation speed may slightly increase or diminish without causing a change of the pitch. As soon as the speed of rotation exceeds 1800 revolutions per minute for instance, the action of the centrifugal force causes the blades of the wind-wheel 12 to extend out of the hood, and thus causes an increase of the pitch of the propeller.

In order to maintain the speed of rotation at the maximum a slight application of the brake 8 may be produced while introducing in the piping controlling this brake a pressure of one kg. per sq. cm., for instance. This will have as consequence to reduce the pitch of the propeller and to increase the speed of rotation to 2100 revolutions per minute, for instance. It is evident that this will result in a certain amount of heat being evolved in the brake and hence in a slight wear, so that this high-speed rate could not be maintained for a long time; but, this method for obtaining an increase of the speed may be of interest in certain cases, especially when starting.

For landing, a high pressure may be produced in the pipe controlling the brake 8, for instance 10 kgs. per sq. cm., so that this brake not only produces the return to the reduced pitch, but even the reversal of the pitch of the propeller, and this irrespectively of the engine speed.

In order to return to the positive pitch, it suffices to release the brake and to increase the speed, the wind-wheel operates then, and automatically increases the pitch, until the speed of 1800 revolutions per minute is attained. The speed can then still be increased and reach the maximum of 2100 revolutions per minute while continuing the increase of speed, and slightly applying the brake (in order to reduce the pitch and hence the resistance to the rotation of the propeller).

Figure 7:
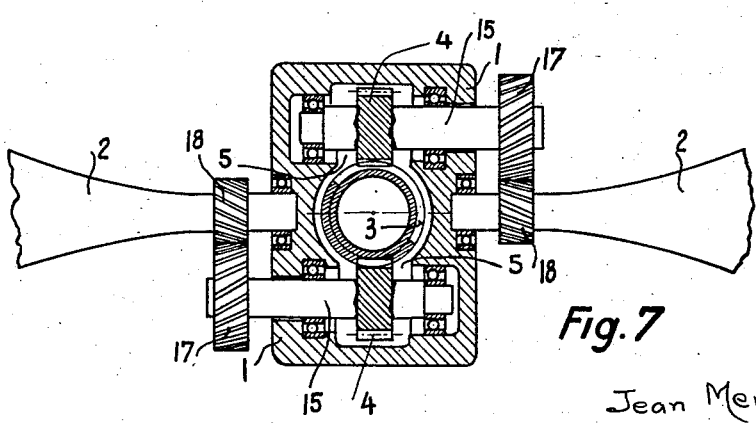
Figure 7 is a view similar to Figure 1 of a modification adapted for the case of a propeller with blades occupying a radial position with reference to the shaft.

Obviously, the invention is by no means limited to the embodiments described and represented, which are given solely by way of example. Thus, the means employed according to the invention may be utilized in the case of propellers other than those having blades mounted tangentially with reference to the hub. For instance, Figure 7 is a view similar to Figure 3 of an embodiment in which the propeller blades occupy a radial position with reference to the hub. At this effect, the toothed part 4, instead of being directly at the bottom of a propeller blade, is mounted on a shaft 15 located in bearings 16—16ª and traversing apertures 5 provided in hub 1. The part of this shaft extending outside the hub carries keyed thereon a pinion 17 which meshes with another pinion 18 pertaining to the bottom of the second propeller blade 2, which latter occupies a radial position with respect to the hub 1.

Having now described my invention, what I claim as new and desire to secure by Letters Patent is:

A variable pitch propeller comprising a hub, an endless screw mounted inside said hub, propeller blades, gear means associated with and acted upon by said screw, and a wind-wheel shaped member mounted on the front end of said screw and comprising blades adapted to be retracted when at rest and to be extended according to the speed of rotation when in operation whereby a braking effect is exerted on the screw and the pitch of the propeller blades automatically increased under the effect of increasing aerodynamic stresses acting upon said wind-wheel, an independently operated fluid pressure actuated brake and gearing between said brake and said screw comprising an outer planetary ring and an inner toothed ring, the latter rigidly connected to said screw, said outer and inner ring cooperating with each other by means of planetary pinions loosely mounted in a third ring secured to the said hub, whereby braking of the outer ring produces an advance of the screw which will reduce and eventually reverse the pitch of the propeller blades.

JEAN MERCIER.